US008055657B2

(12) United States Patent
Lau et al.

(10) Patent No.: US 8,055,657 B2
(45) Date of Patent: Nov. 8, 2011

(54) INTEGRATED ENTITY AND INTEGRATED OPERATIONS OF PERSONALIZED DATA RESOURCE ACROSS THE WORLD WIDE WEB FOR ONLINE AND OFFLINE INTERACTIONS

(75) Inventors: Diana H. Lau, Toronto (CA); Helena Litani, Thornhill (CA); Joanna W. Ng, Unionville (CA); Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 12/248,663

(22) Filed: Oct. 9, 2008

(65) Prior Publication Data

US 2010/0094883 A1 Apr. 15, 2010

(51) Int. Cl.
*G06F 7/00* (2006.01)
*G06F 17/30* (2006.01)
(52) U.S. Cl. ......................... 707/736; 707/737
(58) Field of Classification Search ........................ None
See application file for complete search history.

(56) References Cited

U.S. PATENT DOCUMENTS

| | | | |
|---|---|---|---|
| 7,219,107 B2 | 5/2007 | Beringer | |
| 7,346,668 B2 | 3/2008 | Willis | |
| 7,370,014 B1 | 5/2008 | Vasavada et al. | |
| 7,756,755 B2* | 7/2010 | Ghosh et al. | 705/26.1 |
| 2002/0024536 A1 | 2/2002 | Kahan et al. | |
| 2002/0099562 A1* | 7/2002 | Bruce et al. | 705/1 |
| 2002/0152219 A1* | 10/2002 | Singh | 707/101 |
| 2004/0117376 A1 | 6/2004 | Lavin et al. | |
| 2006/0085330 A1* | 4/2006 | Imrey et al. | 705/39 |
| 2006/0085454 A1* | 4/2006 | Blegen et al. | 707/100 |
| 2007/0136237 A1 | 6/2007 | Barker et al. | |
| 2007/0174903 A1 | 7/2007 | Greff | |
| 2007/0198677 A1 | 8/2007 | Ozhan et al. | |
| 2008/0059415 A1 | 3/2008 | Bakalash et al. | |
| 2008/0059460 A1* | 3/2008 | Lunenfeld | 707/5 |
| 2008/0091797 A1 | 4/2008 | Busey | |
| 2009/0240652 A1* | 9/2009 | Su et al. | 707/1 |

OTHER PUBLICATIONS

Ponzo et al., "On demand Web-client technologies", IBM System Journal, vol. 43, No. 2, 2004, pp. 297-315.

* cited by examiner

*Primary Examiner* — Jay Morrison
(74) *Attorney, Agent, or Firm* — Yee & Asscoiates, P.C.; Justin M. Dillon

(57) ABSTRACT

Embodiments of the invention provide for an integrated entity of a personalized data resource across the WWW with integrated operations. Such embodiments can reside on premises (or service side) as an integrated personalized data resource which is constructed from each of a number of web applications over the Internet that fetch and provide a piece of user information.

21 Claims, 3 Drawing Sheets

INTEGRATED ENTITY AND INTEGRATED OPERATIONS OF PERSONALIZED DATA RESOURCE ACROSS THE WORLD WIDE WEB FOR ONLINE AND OFFLINE INTERACTIONS

BACKGROUND OF THE INVENTION

1. Field of the Invention

The invention claimed herein generally relates to method and apparatus for an integrated entity of a personalized data resource that can provide both personalized integration of data received from, and offline interactions with, the world wide web (WWW) as well as integrated operations that can be applied to the integrated personalized data resource (with its data elements sourced from various internet domains across the WWW). More particularly, the invention relates to an apparatus of the above type that can be used to aggregate data on a personalized basis, wherein the data pertains to a particular domain or category, and has been gathered from different sources of the WWW. Even more particularly, the invention pertains to an apparatus of the above type wherein the apparatus can automatically interact with the WWW, such as getting the latest bank account balance or the like. Integrated operations can be defined to operate upon the aggregated personalized data resource in parts or in whole as one integrated unit of operations. For example: common checkout operation across personalized shopping carts across multiple e-commerce sites of the WWW.

2. Description of the Related Art

Apart from browsing for general information, by using a search engine or the like, the WWW is used for accessing critical personalized information across quite a variety of domains. Examples of this information include personal financial balances; on-line purchases of goods or services; scheduled upcoming flights with particular air carriers; and health records with particular hospitals or other healthcare institutions. However, there is currently a lack of an integrated entity, to both collect and persist or retain these different yet aggregated and possibly related aspects pertaining to user's personalized information, wherein the entity can be selectively manipulated. For example, an individual user could seek to manipulate data obtained from different sources, that all pertained to the same aspect or category, by presenting the data so that it could be viewed in a cohesive, integrated manner.

At present, a collection of bookmarks of all links to various domains can be used to fetch various pieces of information about a specific user, each time that the information is needed. However, this "personalized bookmark" mechanism has a number of limitations. For example, such mechanism lacks a persistence capability, so that an individual user needs to fetch information for each bookmark using the browser every time each of the bookmarks is needed, and then perform the same sequence of user interactions like logon; clicking on links to get to the right page, and providing the same user input e.g. bank account number every time, in order to aggregate the personalized information. Also, an aggregated and integrated entity of personalized user information that is composited from responses of a list of personalized domains will not be available, when a user is offline or is otherwise not connected to the Internet.

Moreover, the concept of an integrated personalized data resource entity, that is constructed from various web applications of the Internet, generally cannot be used to perform certain operations. For example, it is generally not possible to perform a "print" operation of the aggregated financial "aspects" of personalized user information from the domains of various financial institutions. It is also generally not possible to perform the "send operation" of the aggregated "health" aspect of personalized user information, from the domain of various health institutions to the user's family doctor. A further operation that is generally not available with prior art approaches is to "view" the aggregated "shopping" aspect of an individual user, from the domains of various online retailers, in order to see all the shopping carts that the user then has in the WWW.

BRIEF SUMMARY OF THE INVENTION

Embodiments of the invention provide a method and apparatus for aggregation of personalized data resource, as a cohesive entity for personalized data integration which is constructed from each of a number of web applications over the Internet that fetch and provide a sub-model element of personalized data resource entity from web applications of the different corresponding web domains across the WWW. This method and apparatus for aggregated personalized data resource can be used for personalized integration and/or offline interaction with the WWW. Thus, data obtained from different applications or sources of the WWW, that all pertain to a common aspect or category of information pertaining to personalized data resource, can be selectively aggregated or integrated. One embodiment of the invention is directed to a computer implemented method connected with a client or server of which the apparatus for this personalized data integration resides. It is operable to receive a defined piece of information data, conforming to a sub-data-model, provided to the user from the corresponding web application over the web; used as an integrated resource to construct an integrated entity of personalized data. Such sub-model element of personalized data returned from the corresponding web application can further be "tagged" into semantic classification (e.g. 'finance' data about the user; or 'travel' data about the user) to form logical groupings of information data into 'aspects' about personalized data resource pertaining to specific user.

An embodiment of the invention is directed to a method in connection with apparatus for an integrated entity of personalized data that is associated with a user, and is operable to receive informational data from multiple information sources, wherein data received from each source pertains to one of a plurality of categories, and the data received from at least two different sources pertains to the same category. The method includes the steps of selecting a location for a personalized data resource, and for each source, detecting a characteristic that uniquely identifies the category of particular input data sent from the source to the user, wherein the identifying characteristic includes at least a specific format for the particular input data. The identifying characteristics are used to determine that input data, received by the apparatus from at least two of said sources, pertains to the same particular one of the categories. The personalized data resource is operated to selectively aggregate all received input that pertains to the particular category. Other embodiments of this invention include apparatus for logical grouping of the aggregated personalized data resources; and the method and apparatus for access identification for silent certification to enable automated refresh of the aggregated personalized data resource.

DETAILED DESCRIPTION OF THE INVENTION

Figure 1:
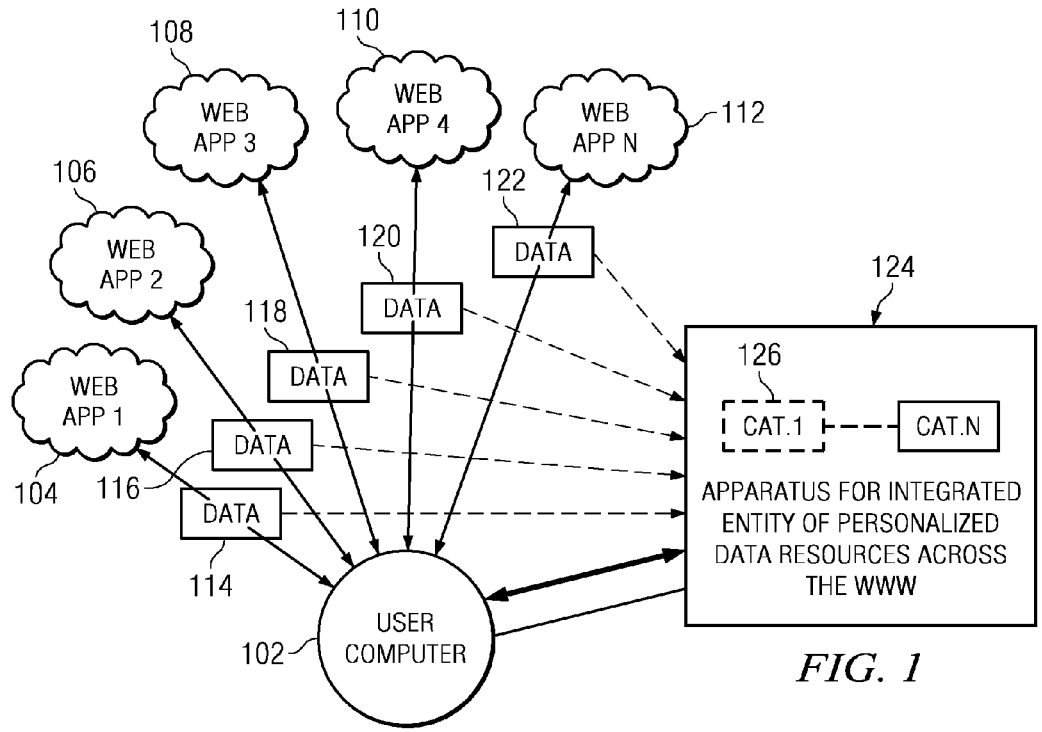
FIG. 1 is a schematic diagram depicting a configuration of components for implementing an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In accordance with embodiments of the invention, each web application of a given server domain is able to provide and "define" a prospective of personalized data resource entity according to a pre-defined sub-data model element, that when aggregated with all other web applications of other server domains, will open up new sets of capabilities that were generally not possible before. For example, in the case of on premises aggregation of a personalized data resource entity, data integration performed by the owner of the data on premises solves and bypasses the "privacy" issue that the current enterprise integration approach cannot (often due to non-technical issues like privacy) as this invention enables data integration on premise as the end user so choose instead of its current limitation of integration only on the server side of the enterprise thus giving rise to the inherent issues of privacy regulation. Also, integrated operations like print, view, send etc of the whole or a specific set of aspects or categories of the personalized data resource entity can be enabled (e.g., send the "financial aspect" of to my financial advisor). This action will not be blocked by privacy issues, since the individual user (or "I") owns all the integrated data himself/herself, and is therefore able to determine how all the integrated data is used.

Referring to FIG. 1, there is shown a user computer 102 connected to interact with web applications 104-112, to selectively receive output data therefrom and to send input data thereto in an automatic fashion based on prior configurations. Applications 104-112 are also referred to as web applications 1-4 and N, respectively. Some of the applications 104-112 serve as sources of informational data that is sought by an apparatus 124 for an integrated entity of personalized data resources across the WWW, wherein the information from an application pertains to a particular aspect, or category, of information. For example, applications 104 and 106 could be sources of healthcare data relating to the user of the computer 102. Thus, input data received by the apparatus 124 for an integrated entity of personalized data, from either of these applications, would pertain to this category. Alternatively, applications 104 and 106 could both be sources of banking or other financial information relating to the user.

Some of the web applications shown by FIG. 1 could also be provided to perform certain tasks, in response to data outputted thereto from apparatus for integrated entity of personalized data resource from WWW 124. For example, applications 108 and 110 may both be configured to enable a user to get his/her bank account balance, or to perform other financial tasks, as directed by the apparatus 124 for integrated entity of personalized data on the user's computer 102. As described hereinafter in further detail, such transactions could require the apparatus 124 to send output data to both applications 108 and 110.

In regard to communications between user's computer 102 of FIG. 1 and the respective web applications 104-112, it is to be understood that there must be some well-established conversational data between the user's computer 102 and respective web applications. That is, there must be interactions therebetween that indicate particular predefined structures or formatting, for data that is inputted to the apparatus for integrated entity of personalized data from a particular application. Similarly, there must be a particular structure or formatting for data that is outputted from the apparatus 124 for integrated entity of personalized data to a particular application. As an example of particular formatting of input data, web application 104 is associated with a bank or other financial institution, in which the user of apparatus 124 for integrated entity of personalized data of the user's computer 102 has an account. Application 106 is similarly associated with a different bank, in which the user also has an account. If the personalized data integration apparatus 124 queries application 104 for the account balance, application 104 will return input data information, such as the name of the bank, the name of the account, and the amount of the balance in the account. The format for this input data could then comprise two strings of particular lengths, one for each of the two names, and an integer for the account balance. Moreover, each time apparatus 124 for integrated entity of personalized data asks application 104 for the account balance, the input data provided in response will have this format. In like manner, in response to querying application 106 for the account balance of its bank, application 106 will respond by sending input data that also has a particular format, or predefined structure. More generally, input data obtained from a Web application will have a specified data format, or structure, such as a format comprising x strings and y integers, where x and y are specified numbers. Accordingly, the particular category of data can be uniquely identified by the specified format.

Referring further to FIG. 1, there are shown data capture elements 114-122, associated with applications 104-112, respectively. Apparatus 124 for integrated entity of personalized data is an integrated resource for use in personalizing both data aggregations and interactions between the user's computer 102 and respective applications 104-112, on behalf of the user of apparatus 124 for integrated entity of personalized data of the user's computer 102. Apparatus 124 may be located on the user's computer 102 of the configuration shown in FIG. 1, and may comprise a component that is integral with computer 102, even though shown separately therefrom in FIG. 1.

Each of the data capture elements 114-122 is disposed to monitor interactions between its corresponding application and the user's computer 102. In addition, each data capture element is adapted to recognize and respond to certain identifying characteristics or features of input and/or output data that pass between its corresponding application and the user's computer. For example, when data capture element 114 initially monitors input data from application 104, it is able to recognize that if the input data from application 104 is formatted to comprise two strings and one integer, then such data comprises account balance data for the user. If this input data is in a category of data that the user seeks to capture, data capture element 114 will extract this formatting information into apparatus 124. Thereafter, any input data received from application 104 that has this formatting will be routed by the data capture element to a specified location, such an account balance data repository 126 associated with apparatus 124. Repository 126 is also shown in FIG. 1 as category 1, of N categories. Category 1 is intended to pertain to all user account balance information from all sources.

Similarly, data capture element 116, provided to monitor application 106, is able to detect that input data having a particular format comprises account balance data from the bank associated with application 106. Data capture element 116 routes this data to the repository 126 of category 1, which already contains balance account data from application 104.

More generally, and as an important feature of embodiments of the invention, apparatus 124 of FIG. 1 establishes aspects or categories for informational data that can be received from different web applications, or other Internet sources. Accordingly, data from multiple sources that all pertains to a particular category can be placed into a single repository or the like. Apparatus 124 can then take this data and aggregate it in some form or manner, as described hereinafter in further detail. Categories or aspects for apparatus 124 can be defined by the user, or may be indicated or suggested by respective applications.

Referring further to FIG. 1, there are shown data capture elements 118 and 120 that monitor output data sent from apparatus for integrated entity of personalized data of the user's computer 102 to applications 108 and 110, respectively. Apparatus for integrated entity of personalized data 124 uses applications 108 and 110 to carry out certain tasks, such as purchasing goods by means of conventional shopping cart procedures.

During runtime, the user either uses a piece of user interaction to (or a batch program can) initiate a data refresh, or perform pre-defined operations. The runtime embodiment of this invention will fetch and supply the user id and user password as an authentication mechanism with the corresponding web application to perform operations (e.g. update operation or checkout operations) associated with a pre-defined set of logical groupings, using semantic association via previously set tags.

In embodiments of the invention, the apparatus 124 for an integrated entity of personalized data contains several sub-model elements. These include Access Identification, which is a model element for personalized data resource entity to capture personalized security data needed to access each specific domain of the WWW of a given web application. This model element can contain an account ID; a user ID; a password; and any other pieces of identification for secured access of the corresponding web application of a given domain. The Access Identification element is always marked "private". Another model element of apparatus for integrated entity of personalized data 124 is "WebAboutMe", which is a sub-model element returned from each web application that is used to construct the aggregated entity of personalized data resource 124. The sub-model is defined and supplied by the web application. The model conforming data element is sent as an output message by the web application, and includes an Aspect Tag and a Privacy Tag. The Aspect Tag is a text-based tag for a personalized data resource entity aspect, and can be supplied by web application. The Aspect Tag can also be set by the user.

A further embodiment of apparatus 124 for integrated entity of personalized data 124 is a set of defined operations. These operations include viewing or printing the entire data contained in a selected, predefined aspect or category of the personalized data resource entity data. The operations further include sending the entire personalized data resource entity, or selected predefined aspects of it, to other users of my choice within my right; receiving and viewing personalized data resource entity aspects of other persons, which they are entitled to send; and the capability to implement different semantics of the same operations, depending on whether or not the personalized aspect is marked (private) in the associated attribute. Operations of the above type can associate with any grouping of sub-model elements. Operations that include sub-model elements which are "private" will be performed in an encrypted and decrypted manner.

In an embodiment pertaining to a method, the apparatus for an integrated entity of personalized data is operated to perform a set of pre-defined operations (e.g., print, view, send, checking out from shopping cart, etc.) that can be performed with the integrated entity of personalized data to its entirety or as a sub-entity based on the logical grouping previously set (e.g. by tags). Another embodiment of this invention is a runtime apparatus that acts as a container and manager of such aggregated entities and its sub-model elements and the corresponding operations, as well as performing the job of:
   a. initialization of access identification of the sub model data element per each corresponding web application and the associated tagging and categorization.
   b. Updating the latest data instances from the server
   c. Providing and performing common operations previously listed.

In other embodiments of the invention, a method enables an association of semantic taxonomy of data elements of the integrated personalized data entity using tagging. Such tagging forms units of logical groupings that provide the definition of a unit of operations (e.g. print, view, checkout, etc.). The defined association of the semantic tags (e.g. "shopping cart" as a tag) is enabled to be associated with pre-defined operations (e.g. "check-out") that will operate on such logical grouping as an integrated operations and entities, as another example. "ALL" function associated with "print, view" etc. operations . . . or "health" associated with "print" can be used to print all used personal health related data of the user that is integrated across the WWW.)

Figure 2:
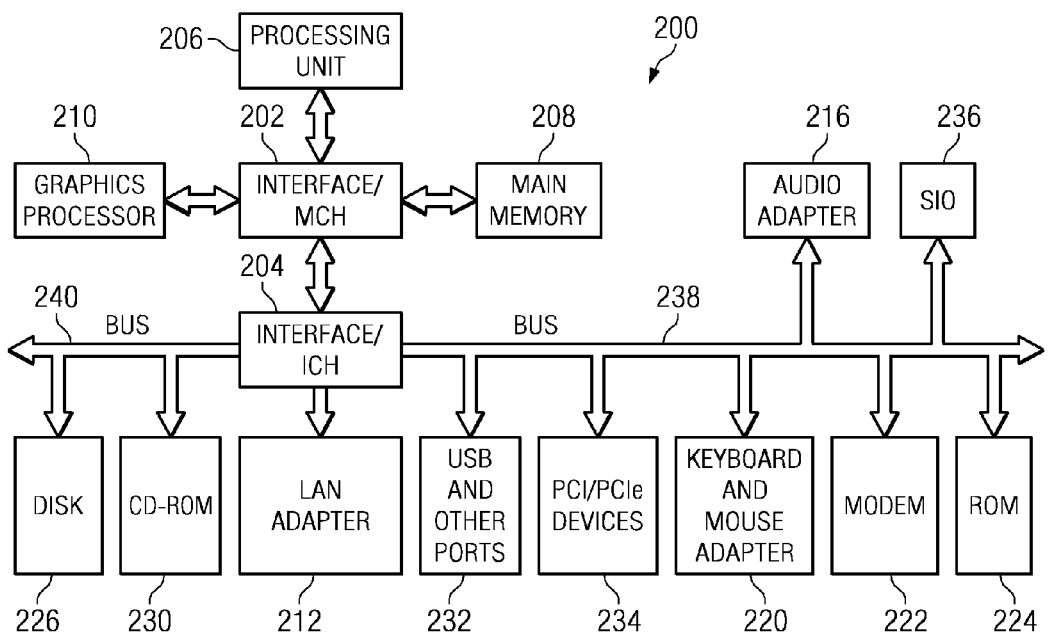
FIG. 2 is a block diagram showing a computer or data processing system that may be used in implementing embodiments of the invention.

Referring to FIG. 2, a block diagram of a data processing system is shown in which aspects of the present invention may be implemented. Data processing system 200 is an example of a computer, 102 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

Figure 3A:
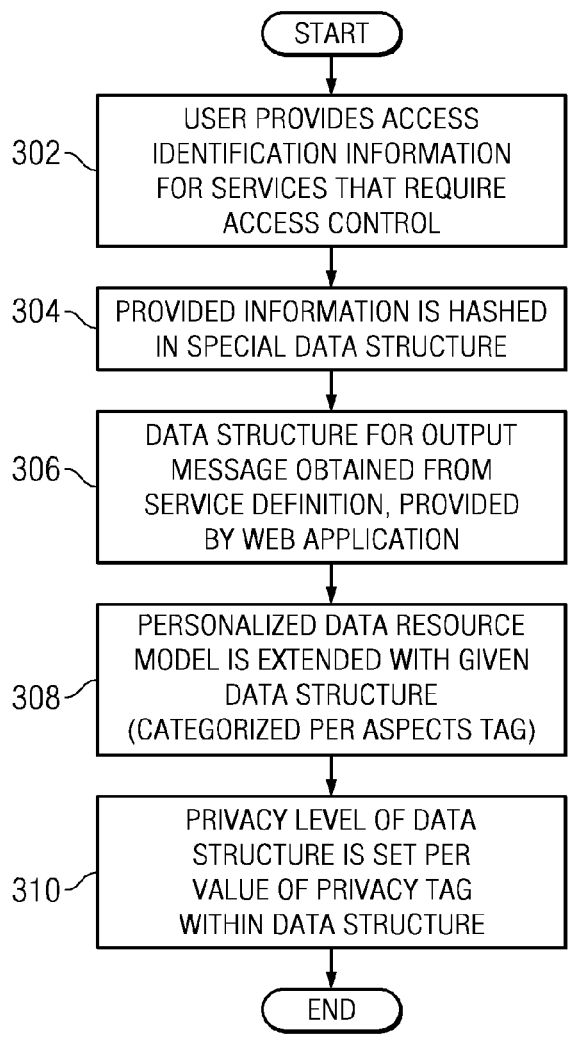
FIGS. 3A-3C are flowcharts depicting steps of respective methods comprising or in support of embodiments of the invention.

FIG. 3A illustrates the initialization process of first access. The user first provides access identification information for the service that requires access control (step 302). These services correspond to its sub-model element returned from each Web application. This provided information is hashed in a special data structure (step 304) and then sent to the Web application. The Web application returns with an output message which conformed to the data structure defined in the service definition (step 306). Subsequently, the personalized data resource model is extended with that given data structure. Tags can be applied to each sub-model element including aspects tag and privacy tag (step 308). The privacy level of a data structure is set per value of privacy tag within the data structure (step 310).

Figure 3C:
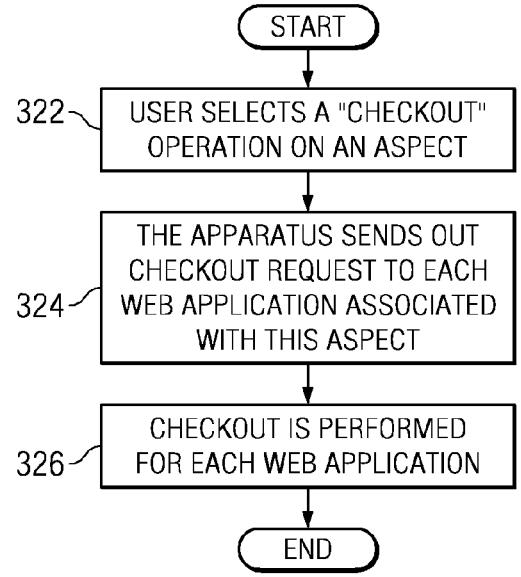
Figure 3B:
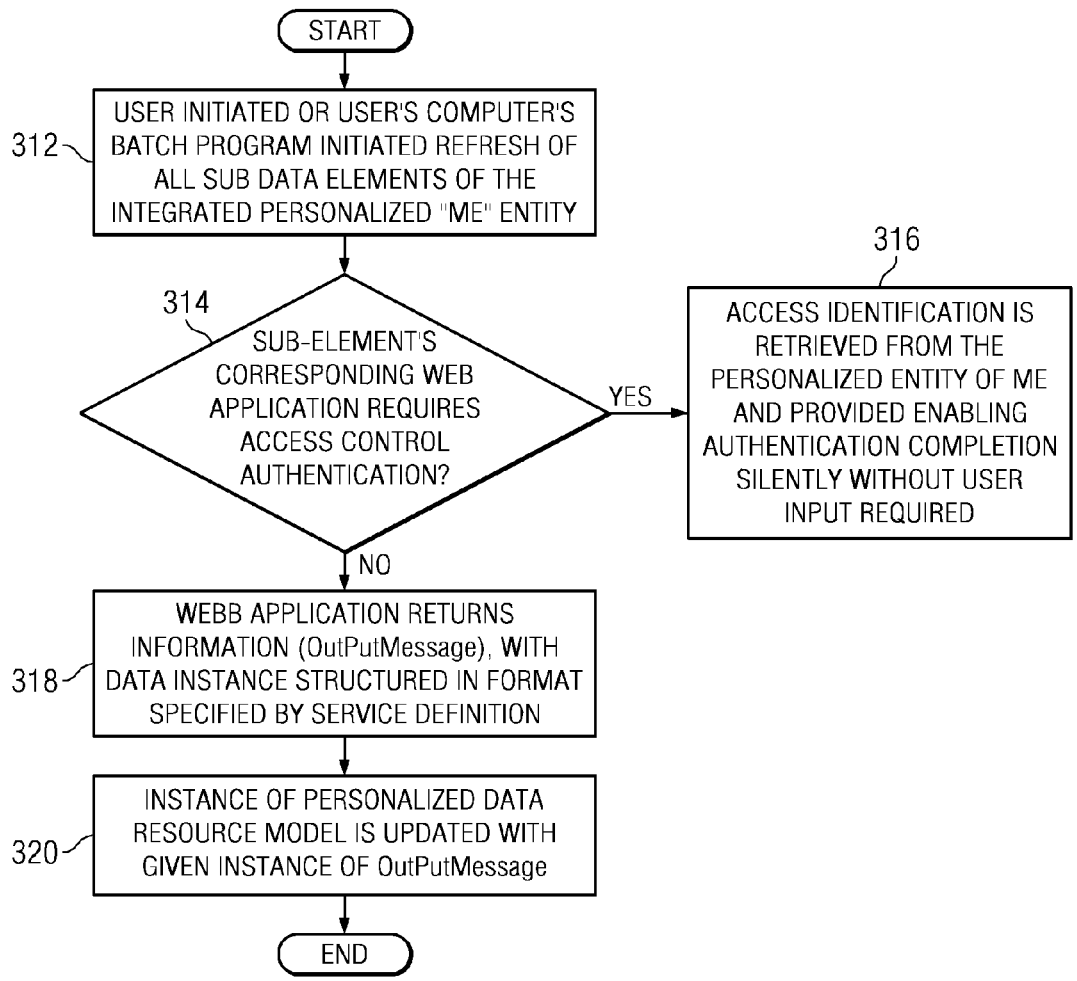

Referring to FIG. 3B, there is shown a flowchart depicting selected steps in a method in accordance with an embodiment of the invention. At step 312, the user or the batch program of the user's computer initiates refresh of all sub-model elements of the integrated personalized information entity. Each corresponding Web application may require access control authentication, as shown by determining step 314.

If the Web application requires authentication, there is an additional step that happens with additional steps. The access identification is retrieved from the integrated personalized data resource and it enables authentication completion without user input (step 316). The personalized data resource entity aggregates data contained in the repository for the particular data category, such data is retrieved from different web application. The particular data category could, for example, be medical or healthcare information pertaining to the user, which is received from different sources, such as a healthcare institution and two different doctors. The personalized data resource entity could be configured to aggregate all of this data by placing the data into a single textual document having a pre-specified format. The aggregated information could also be sent by email or other means to a recipient, wherein such action could be taken by the user, as the owner of the information could also be sent by email or other means to a recipient, wherein such action could be taken by the user, as the owner of the information. As described above, an aggregation of this type enables an individual to assemble and aggregate his/her personal healthcare information from multiple sources, even though each of these sources may be prevented by privacy requirements or the like from taking action. Eventually, the instance of the personalized data resource model is updated with the given instance of output message.

At step 318 the Web application returns information as an Output Message, with a data instance structured in a format specified by a service definition. At step 320, an instance of a personalized data resource is updated with a given instance of an Output message.

FIG. 3C describes how an integrated operation is being executed for a given aspect. For example, the user selects a "checkout" operation from an Aspect (step 322). The apparatus goes through the sub-model element associated with the Aspect (step 324) and then sends out a checkout request to each Web application (step 326).

Another embodiment of this invention includes a runtime program that encapsulates the initialization of the first access of the web application; the update of methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
selecting a location for a personalized data resource;
constructing, by a processor of a computer operable to receive input data associated with a user from web applications over an Internet, an aggregated entity using sub-model elements returned from each of two or more web applications;
for each of the two or more web applications, detecting, by the processor of the computer, characteristics that uniquely identify categories of data sent from the web applications to the computer, wherein the characteristics include at least a specific format for particular input data from each the two or more web applications;
using the characteristics to determine that the particular input data, received by said personalized data resource from the two or more web applications, pertains to one category; and
operating said personalized data resource to selectively aggregate all particular input data that pertains to the one category into the aggregated entity of the personalized data resource.

2. The method of claim 1 further comprising:
monitoring output data that is sent from personalized data resource to a particular web application of the two or more web applications, in order to cause said particular application to perform a specified task;
detecting specified user related data included in said output data, wherein said specified user related data is required by said particular web application to perform said specified task;
operating said personalized data resource to selectively retain a copy of said specified user related data; and
subsequently operating said personalized data resource to automatically send said user related data to said particular web application, in order to again cause said particular web application to perform said specified task.

3. The method of claim 2, wherein:
said specified task comprises a shopping cart purchasing procedure.

4. The method of claim 1, wherein:
said specific format for the particular input data includes a specified number of each of one or more specific data types.

5. The method of claim 1, wherein:
said method includes the step of enabling an association of semantic taxonomy of data elements of the aggregated entity using tagging.

6. The method of claim 5, wherein:
said tagging forms units of logical groupings that provide a definition of a unit of operations that includes at least one of operations of print, view and checkout, selectively.

7. The method of claim 6, wherein:
semantic tags associated with said semantic taxonomy are associated with at least one pre-defined operation on a specified logical grouping, wherein pre-defined operations include at least one of the operations of print, view and checkout, selectively, and said specified logical grouping is selected from a set of groupings that includes at least personal health related data of said user that is integrated across a world wide web.

8. The method of claim 1, wherein:
said categories of data include at least one category pertaining to healthcare information, financial information, and travel information that is respectively personal to said user.

9. The method of claim 1, wherein aggregating said all received input data includes placing said all received input data into a single document, or sending said all received input data to a recipient designated by said user, selectively.

10. The method of claim 1, wherein:
said personalized data resource comprises said aggregated entity of personalized data and resides on the user's computer or server.

11. A computer program product comprising:
one or more computer readable, non-transitory devices;
instructions stored in at least one of the one or more computer readable, non-transitory devices for selecting a location for a personalized data resource;
instructions stored in at least one of the one or more computer readable, non-transitory devices for constructing an aggregated entity using sub-model elements returned from each of two or more web applications;
instructions stored in at least one of the one or more computer readable, non-transitory devices for detecting, for each of the two or more web applications, characteristics that uniquely identify categories of data sent from the web applications, wherein the characteristics include at least a specific format for particular input data from each of the two or more web applications;
instructions stored in at least one of the one or more computer readable, non-transitory devices for using the characteristics to determine that the particular input data, received by said computer from the two or more web applications, pertains to one category; and
instructions stored in at least one of the one or more computer readable, non-transitory devices for operating said apparatus to selectively aggregate all particular input data that pertains to the one category into the aggregated entity of the personalized data resource.

12. The computer program product of claim 11 further comprising:
instructions stored in at least one of the one or more computer readable, non-transitory devices for monitoring output data that is sent from said personalized data resource to a particular web application of the two or more web applications, in order to cause said particular web application to perform a specified task;
instructions stored in at least one of the one or more computer readable, non-transitory devices for detecting specified user related data included in said output data, wherein said specified user related data is required by said particular web application to perform said specified task;
instructions stored in at least one of the one or more computer readable, non-transitory devices for operating said personalized data resource to selectively retain a copy of said specified user related data; and
instructions stored in at least one of the one or more computer readable, non-transitory devices for subsequently operating said personalized data resource to automatically send said user related data to said particular web application, in order to again cause said particular web application to perform said specified task.

13. The computer program product of claim 12, wherein:
said specified task comprises a shopping cart purchasing procedure.

14. The computer program product of claim 12, wherein:
said specific format for the particular input data includes a specified number of each of one or more specific data types.

15. The computer program product of claim 14, wherein:
said specific data types include one or more data types selected from a group that includes at least strings, integers and objects.

16. An apparatus comprising:
one or more processors, one or more computer readable memories, and one or more computer readable, non-transitory storage devices;
program instructions stored in the one or more computer readable, non-transitory storage devices for execution by the one or more processors via the one or more computer readable memories for selecting a location for a personalized data resource;
program instructions stored in the one or more computer readable, non-transitory storage devices for execution by the one or more processors via the one or more computer readable memories for constructing, an aggregated entity using sub-model elements returned from each of two or more web applications;
program instructions stored in the one or more computer readable, non-transitory storage devices for execution by the one or more processors via the one or more computer readable memories for detecting, for each of the two or more web applications characteristics that uniquely identify categories of data sent from the web applications, wherein the characteristics include at least a specific format for the particular input data from each of the two or more web applications;
program instructions stored in the one or more computer readable, non-transitory storage devices for execution by the one or more processors via the one or more computer readable memories for using the characteristics to determine that the particular input data, received by said computer from the two or more web applications, pertains to one category; and
program instructions stored in the one or more computer readable, non-transitory storage devices for execution by the one or more processors via the one or more computer readable memories for operating said personalized data resource to selectively aggregate all particular input data that pertains to the one category into the aggregated entity of the personalized data resource.

17. The computer apparatus of claim 16, further comprising:
program instructions stored in the one or more computer readable, non-transitory storage devices for execution by the one or more processors via the one or more computer readable memories for monitoring output data that is sent from said personalized data resource to a particular web application of the two or more web applications, in order to cause said particular web application to perform a specified task;
program instructions stored in the one or more computer readable, non-transitory storage devices for execution by the one or more processors via the one or more computer readable memories for detecting specified user related data included in said output data, wherein said specified user related data is required by said particular web application to perform said specified task;
program instructions stored in the one or more computer readable, non-transitory storage devices for execution by the one or more processors via the one or more computer readable memories for operating said personalized data resource to selectively retain a copy of said specified user related data; and
program instructions stored in the one or more computer readable, non-transitory storage devices for execution by the one or more processors via the one or more computer readable memories for subsequently operating said personalized data resource to automatically send said user related data to said particular web application, in order to again cause said particular web application to perform said specified task.

18. The apparatus of claim 17, wherein:
said specified task comprises a shopping cart purchasing procedure.

19. The apparatus of claim 17, wherein:
said specific format for the particular input data includes a specified number of each of one or more specific data types.

20. The apparatus of claim 19, wherein:
said specific data types include one or more data types selected from a group that includes at least strings, integers and objects.

21. The apparatus of claim 16, wherein:
said personalized data resource implementation can exist on either a server side or a client side.

* * * * *